(12) United States Patent
Char et al.

(10) Patent No.: US 9,712,410 B1
(45) Date of Patent: Jul. 18, 2017

(54) LOCAL METRICS IN A SERVICE PROVIDER ENVIRONMENT

(71) Applicant: Amazon Technologies, Inc., Reno, NV (US)

(72) Inventors: Hanson Char, Mercer Island, WA (US); David Baiyor Murray, Seattle, WA (US); Wade Alvin Matveyenko, Redmond, WA (US); Jason Fulghum, Seattle, WA (US); Manikandan Subramanian, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 260 days.

(21) Appl. No.: 14/315,197

(22) Filed: Jun. 25, 2014

(51) Int. Cl.
 *H04L 12/26* (2006.01)
(52) U.S. Cl.
 CPC .................................. *H04L 43/08* (2013.01)
(58) Field of Classification Search
 CPC ........................................................ H04L 43/08
 See application file for complete search history.

(56) References Cited

U.S. PATENT DOCUMENTS

| | | | | |
|---|---|---|---|---|
| 6,556,540 | B1* | 4/2003 | Mawhinney | H04L 1/20 370/229 |
| 6,651,142 | B1* | 11/2003 | Gorelik | G06F 17/30902 707/E17.12 |
| 8,266,243 | B1* | 9/2012 | Carlson | H04N 21/6582 709/202 |
| 8,966,039 | B1* | 2/2015 | Fultz | H04L 67/16 709/223 |
| 2002/0099818 | A1* | 7/2002 | Russell | H04L 67/02 709/224 |
| 2007/0271379 | A1* | 11/2007 | Carlton | G06F 21/6263 709/225 |
| 2008/0034060 | A1* | 2/2008 | Fisher, Jr. | G06F 9/4446 709/218 |
| 2008/0046303 | A1* | 2/2008 | Gordon | G06Q 10/0635 705/7.28 |
| 2008/0137549 | A1* | 6/2008 | Manthoulis | H04L 41/509 370/252 |
| 2010/0251218 | A1* | 9/2010 | Mahesh | G06F 11/0748 717/127 |
| 2011/0254961 | A1* | 10/2011 | Putnam | H04L 43/08 348/180 |
| 2013/0058221 | A1* | 3/2013 | Andersen | H04L 43/08 370/242 |
| 2013/0136253 | A1* | 5/2013 | Liberman Ben-Ami | H04M 3/5191 379/265.09 |
| 2013/0305093 | A1* | 11/2013 | Jayachandran | G06F 11/0754 714/37 |
| 2014/0155043 | A1* | 6/2014 | Gell | H04W 4/003 455/414.1 |

(Continued)

*Primary Examiner* — Uzma Alam
(74) *Attorney, Agent, or Firm* — Thorpe North & Western LLP

(57) ABSTRACT

Technology for provision and use of local metrics in a multi-tenant service provider environment is provided. In one example, a method may include receiving service provider environment metrics from a computing instance and receiving local metrics from a local machine in a multi-tenant service provider environment. The local metrics may be combined with the service provider environment metrics and provided for display together.

20 Claims, 7 Drawing Sheets

(56) References Cited

U.S. PATENT DOCUMENTS

| | | | |
|---|---|---|---|
| 2014/0176345 A1* | 6/2014 | Schiff | G07C 3/14 340/870.16 |
| 2014/0195668 A1* | 7/2014 | Selvakumar | H04L 41/147 709/224 |
| 2014/0280488 A1* | 9/2014 | Voit | H04L 67/10 709/203 |
| 2015/0058679 A1* | 2/2015 | Jackson | G06F 11/3433 714/47.2 |
| 2015/0358391 A1* | 12/2015 | Moon | H04L 67/10 709/224 |

* cited by examiner

LOCAL METRICS IN A SERVICE PROVIDER ENVIRONMENT

BACKGROUND

Applications and computing services are often made available over the Internet or other computer networks. Content providers, application providers, and/or computing service providers often utilize remote computing services to providing access to electronic resources, such as web services. Electronic resources may include processing services, memory services, storage services, networking services and generally any computing services supported by a hardware substrate that used in a computing environment. Often hardware and/or software used to support the desired services are dynamically scalable to meet the changing load for the services at any given time. Users, for example, may rent, lease, or otherwise pay for access to networked computing resources and computing services, and thus reduce the burden of providing local hardware and/or software for computing services, as compared with implementations without network accessible computing services.

To facilitate increased utilization of network accessible computing resources provided via a data center, virtualization technologies can allow a single physical computing machine to host one or more instances of virtual machines that appear and operate as independent machines to a connected computer user. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis. As the scale and scope of data centers has increased, the task of provisioning, administering, and monitoring the physical and virtual computing resources of the data center has become increasingly complicated.

DETAILED DESCRIPTION

Technology for the provisioning and use of local metrics in a service provider environment is provided. In one example, a method may include collecting service provider environment metrics from a computing service or compute instances in a service provider environment and collecting local metrics from a local machine, such as a Software Development Kit ("SDK") or a process virtual machine (e.g., a Java Virtual Machine). The local metrics may be combined with service provider environment metrics from the service provider environment and may be further provided for display together with the service provider environment metrics from the service provider environment. The computing service may be a networked computing service or resource such as, for example, a compute, storage, networking and/or other computing resource.

In a more specific example, a method for the provisioning and use of local metrics in a service provider environment may include collecting local metrics from a local machine and collecting service provider environment metrics from a computing instance in a service provider environment accessible via a computer network. The local metrics may relate to performance of the local machine during execution of an application that utilizes a computing service on the computing instance. The local metrics may be uploaded to the service provider environment in a format suitable for combination with data representing the service provider environment metrics. The service provider environment metrics and the local metrics may be compared to identify a source of performance issues. The local metrics and the service provider environment metrics may be provided for display together from the service provider environment. The technology may enable the management of metrics in a service provider environment, as well as troubleshooting of issues that arise for applications, services or the like with components executed or available from the local machine and the computing instance.

Figure 1A:
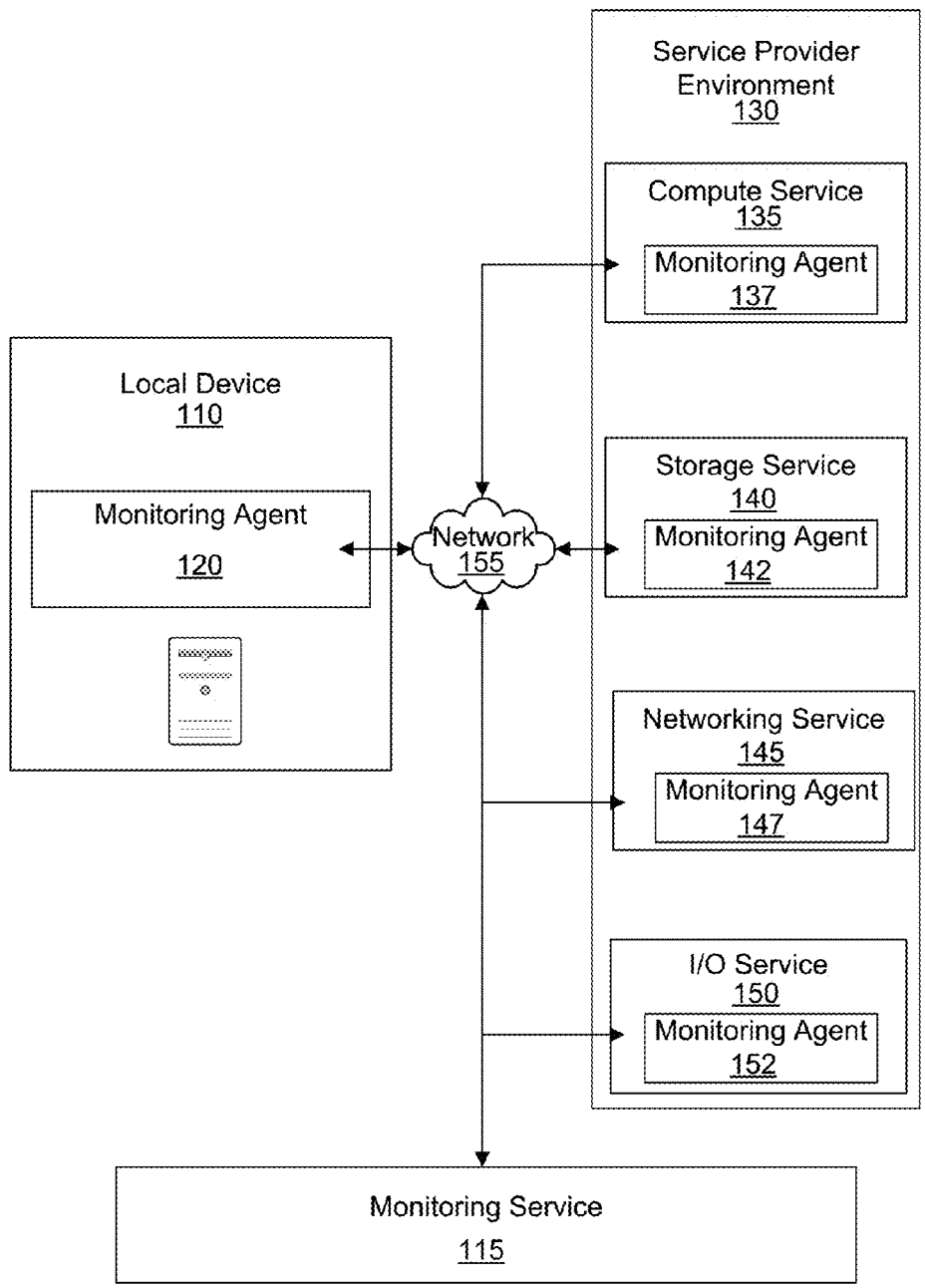
FIGS. 1A-1B are block diagrams of implementations of metrics collection systems in accordance with examples of the present technology.

FIG. 1A illustrates a block diagram of an example implementation of a system for gathering metrics from a local device 110 and from services or computing resources 135, 140, 145, 150 available in a service provider environment 130. The local device 110, or an application executing thereon, may have access to or be associated with a service provider environment 130 for providing network-based services or computing resources. These computing services provide access to a hardware substrate that is underlying the computing resources. FIG. 1A illustrates some example networked computing services, such as a compute service 130, a storage service 140, a networking service 145 and an I/O service 150. For example, a computing instance may be executing on a hypervisor, which in turn executes on a hardware substrate that is server hardware.

As used herein "virtual computing" may refer to the use of computing services (hardware and/or software) which may be available at a remote location from the users of the computing services and the virtual computing services may be accessible over a network 155, such as the Internet. Users may be able to buy these computing services (including storage, computing power, networking and applications) as a utility on demand and sometimes by the hour. Use of virtual computing services can provide a number of advantages including cost advantages and/or the ability to adapt rapidly to changing computing service needs.

The service provider environment 130 may be a multi-tenant service provider environment, such as a "cloud" environment for example. The service provider environment 130 may include an execution environment or a computing instance that includes an application software stack for the user's program or application together with one or more infrastructure services for executing the user's program on the compute service 135. The virtualization environment or computing instance may include a user-selectable operating system (e.g., Linux, Windows, etc.), application server (e.g., Apache Tomcat), system or application configuration, etc. The virtualization environment can be configured to be accessed at a specific URL. The infrastructure services can include, but are not limited to, a load balancer to distribute workload across the requested computing services, a load scaler to scale computing services in response to load or demand variations, a firewall or other service to control access to the computing services, a monitoring interface that permits the user to monitor execution of applications, data storage resources (e.g., scalable volume block storage), and so forth. In some embodiments, the user may be able to select one or more services that may be accessed in the virtualization infrastructure. For example, the user may be able to select from a plurality of database models (e.g., a relational database, SQL database, NoSQL database, Oracle database, etc.). In some embodiments, the infrastructure services can be customized to the user rather than being a shared resource among a plurality of users. For example, in some such embodiments, the load balancer can be individually customized to the user's application rather than being shared or distributed among a number of users of the computing service provider.

The service provider environment 130 may be capable of delivery of computing and storage capacity, as well as other computing services, as a service to a community of end recipients. In an example implementation, the service provider environment 130 may be established for an organization (i.e., a "customer") by or on behalf of the organization. That is, the service provider may offer a "virtual private cloud environment."

In one example, a service provider environment 130 may include any number of server computers for a compute service 135. The server computers may provide computing services for executing software or computing instances, which may also be referred to as virtual machines. A virtual machine may generally be an instance of a software implementation of a machine (i.e. a computer) that executes computer code like a physical machine.

An application may be software or a computer program, such as may be designed to help a person perform an activity. An application may manipulate text, numbers, graphics, etc. Some application packages offer focused computing functions by focusing on a single task, such as word processing. Other application packages, such as integrated software packages, may offer less focus but may include multiple applications to perform multiple tasks. User-written software applications tailor systems to meet a user's specific needs. User-written software may include custom numerical processing, internet services, web servers, scientific simulations, graphics rendering and animation processes, email filters and so forth. Applications executable on the local device and/or in the service provider environment may be any suitable type or form or application as may be appreciated.

The local device 110 may include a monitoring agent 120 for measuring and/or collecting metrics related to the local device, such as related to the performance of the local device. The monitoring agent 120 may be integrated into an application on the local device. The monitoring agent may be an SDK, a daemon, instrumentation or other technology for collecting metrics. The monitoring agent 120 may provide a client API (application programming interface) in one or more various programming languages to enable users to write code in a preferred location against APIs exposed in an SDK, such as Java .NET, IOS, Ruby, etc. The SDK may transform or translate requests in programming languages to HTTP (hypertext transfer protocol) requests for the web service APIs of the service provider that are supported by the SDK. In a specific example, the monitoring agent 120 may specifically measure and/or collect metrics related to performance of the device during execution of a specific, identified application. In the example where the monitoring agent is integrated within the SDK, the SDK itself can be used to monitor or collect metrics about the local machine, the application the SDK is integrated with, the web service API requests made by the SDK. In addition, the SDK can make web service API calls, or to format, convert or summarize collected metrics. In an embodiment, the application (via the SDK) may be in communication with the computing services in the service provider environment. For example, the application may send data to and receive data from the service provider environment. Certain processing tasks for the application on the local device 110 may be performed by the compute service, data for the application on the local device 110 may be stored by the storage service and so forth. The computing services in the service provider environment 130 may also be monitored using monitoring agents 137, 142, 147, 152 to measure and/or collect metrics related to the computing services in the service provider environment.

Metrics data may be collected for the various computing services that have been allocated for a user. Metrics data of the computing services may be analyzed, trended, reported, etc. to monitor the usage patterns and functioning of the computer resources. Metrics data may be collected by a metrics collector or a monitoring agent, for example. Operational performance, resource utilization, demand patterns, etc. of the computer resources may be measured. In some implementations, the metrics data may be tagged as requested by a requesting user or application. The requesting user or application may request that the service provider environment 130 add key/value pairs to the metrics data so that the tagged metrics data may later be processed. The tagged metrics data may be output to a user or application.

As used herein, the term "measurement" may indicate an observed value with a set of attributes. For example, a measurement may include a name, a set of dimensions, a namespace, a unit, and/or a timestamp among possibly other (or fewer) characteristics. As used herein, the term "dimension" may be used to specify how a measurement can be aggregated, such as by InstanceID, InstanceType, Availability Zone, or other factors (described in detail below). As used herein, a namespace may identify the service that collected the measurement. Furthermore, as used herein, a metric may include an aggregation of measurements data.

A user may specify one or more metrics that define how the various measurements are to be aggregated. For instance, metrics data may include the same attributes as the measurements data and may be the aggregate of some or all measurements with a given name, within a given period of time. As another example, a metric may include an aggregation of some or all of the measurements in a particular namespace, or another metric can include an aggregation of some or all measurements having a particular InstanceID, etc. A metric may, in some embodiments, be an aggregation of other metrics. As a result of this flexibility, in certain embodiments, metrics may include a variety of dimensions based on the preferences of the user.

FIG. 1A further illustrates a monitoring service 115. The monitoring service 115 may be part of the service provider environment 130 or may be separate from the service provider environment 130, as illustrated. The monitoring service 115 may receive the metrics collected by the monitoring agents 120, 137, 142, 147, 152 at the local device and in the service provider environment. The monitoring service 115 may provide monitoring for local and networked computing services and the applications customers run thereon. As used herein a "local" device, service or the like may refer to a device or service that is local to a user or developer or on the user or developer's network or virtual local network (VLAN), or otherwise independent of and/or separate and distinct from services or devices provided through the service provider environment 130. Developers and system administrators may use the monitoring service to collect and track metrics, gain insight, and react promptly to keep applications and businesses running smoothly. The monitoring service 115 may monitor the computing services, such as the compute service, the storage service, the networking service and the I/O service, and may also monitor custom metrics generated by a user's applications and services. The monitoring service 115 may further monitor the local device 110 and/or any custom metrics generated by an application or service executing on the local device 110. The monitoring service 115 may provide system-wide visibility into resource utilization, application performance, and operational health for both local and networked computing services.

The monitoring service 115 may provide a reliable, scalable, and flexible monitoring solution that may be readily implemented and used. Users may avoid the hassle of setting up, managing, or scaling their own monitoring systems and infrastructure. Using the monitoring service 115, users may monitor as much or as little metric data as desired. The monitoring service 115 may enable users to programmatically retrieve monitoring data, view graphs, and set alarms to assist in troubleshooting, spotting trends, and taking automated action based on the state of applications or services on the local device 110 and/or in the service provider environment 130.

Figure 1B:
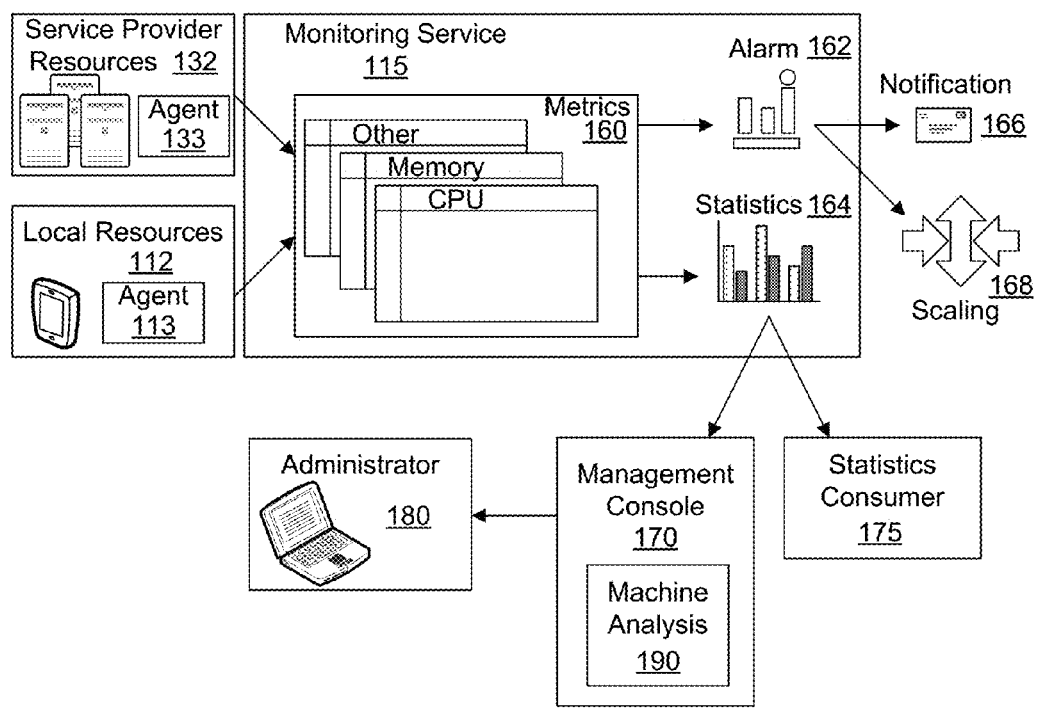

Reference will now be made to FIG. 1B. As discussed with respect to FIG. 1A, computing resources in a service provider environment (i.e., service provider services or resources 132 or simply "services") or local devices (i.e., local resources 112) may be monitored and metrics may be collected by an agent 113, 133 and sent to a monitoring service 115. The monitoring service 115 may enable monitoring of local and/or service provider environment resources as events occur, including, for example, monitoring: computing instances, storage volumes, elastic load balancers, relational database service database instances and so forth. Metrics 160 such as CPU utilization, latency, and request counts may be provided automatically for the resources. Users may further supply custom application and system metrics, such as memory usage, transaction volumes, or error rates, which may be monitored in the monitoring service. With the monitoring service 115, users may access up-to-the-minute statistics 164, view graphs, and set alarms 162 for metric data. The monitoring service 115 functionality may be accessible by an administrator via API (application programming interface), command-line tools, an SDK, and/or a management console 170.

The service provider resources 132 and local resources 112 may be located in different physical locations and may be monitored using monitoring agents 133, 113 respectively, and default or predefined metrics may be collected. In addition, the user may submit custom metrics generated by specific applications (or by other resources not mentioned above) and have these custom metrics monitored in the monitoring service 115. These metrics may be submitted to the monitoring service 115 via an API request (e.g., via a PUT API call), for example. The metrics may be submitted using standalone API calls that may be entirely decoupled from any other API calls made (e.g., by the application in communication with the computing resources in the service provider environment). In other words, the metrics API calls may be configured to avoid "piggy-backing" on other application API calls.

Before submitting the metrics from the local resources 112 to the monitoring service 115, the metrics may be converted or formatted using a software development kit (SDK). The SDK may be configured to take the raw metrics as input and to output the metrics as formatted metrics. The SDK may run in a process space of the user, such as in the user domain or user space. The local metrics may be from any of a variety of types of machines or devices and thus the local metrics may not be readily integrated with the service provider resource metrics (or service provider environment metrics) without the conversion. The SDK on the local resource(s) may be unaware of how the local metrics will be used or interpreted in the service provider environment, but may simply know how to format the local metrics into a defined format. In examples where the service provider resources and the monitoring service are both part of and/or provided through a service provider environment, the monitoring service may be configured to understand and utilize the metrics from the service provider resources without conversion. In some examples, the SDK may be an API or may contain an API, framework, tools and so forth to perform the conversion or formatting and perform other processes or tasks.

The SDK may be written in one or more programming languages and used to communicate with the service provider environment. The SDK may be a collection of tools for developers creating applications to run on and/or access service provider resources such as storage or compute resources, for example. The SDK may include language specific (e.g., Java) implementations of the web service APIs (application programming interfaces) used by the service provider. These language specific APIs can be used to connect to service provider resources, such as a storage service, a notification service, a queue service, a NoSQL database service, a computing service or any other suitable service. The SDK may further include class libraries that eliminate the need for developers to write lower-level code for functions such as networking redundancy and error checking. In some embodiments, the SDK may include a client-side encryption mechanism that helps improve the security of storing application data in a storage service in the service provider environment. Since encryption and decryption is performed client side, the private encryption keys may not leave the application. The SDK may further eliminate the need for application-level data conversions and custom middleware solutions. The SDK may use an API to provide enhanced throughput, performance, and reliability by making use of multi-threaded storage multipart uploads. The SDK may provide client-side buffering that collects and sends queuing requests in asynchronous batches, improving application and network performance.

In one example, formatting of the local metrics may include digesting or summarizing the local metrics without any other specific conversion. Summarizing the local metrics may include, for example, eliminating extraneous data, selecting representative data points to the exclusion of other cumulative data points, selecting data from predetermined time intervals from among the monitored data, and so forth. Summarizing the local metrics may reduce the data to be uploaded to the service provider environment, resulting in improved efficiency. A greater quantity of useful data may be transmitted in a shorter time using summarized data. Also as a result, performance of the application or the local resources 112 may not be negatively impacted. If the metrics collection and submission consumes a large percentage of available bandwidth for communicating with the service provider environment, for example, then performance of the functions of the application relying on the service provider resources may suffer. Summarizing the local metrics may reduce or avoid such detrimental effect. Metrics collection may be secondary to the purpose or function of the application and thus preferably may not affect the performance of the application.

In one example, the local resources 112 may include a computing device running a Java virtual machine or other suitable run-time, virtual machine or framework implemented using any suitable technology such as .NET, Dalvik, ART or the like, and which may be instrumented for metrics collection. The local metrics may be extracted from the Java virtual machine and uploaded to the monitoring service using a format modeled to be compatible with the monitoring service. The conversion to the compatible format may be a conversion to a metrics framework built on a service provider interface (SPI). The SPI may be a service with a defined set of interfaces and classes. The classes in a SPI typically implement the interfaces and subclass the classes defined in the service. SPIs may be installed in an implementation of the Java platform in the form of extensions, that is, .JAR files placed into extension directories. Some non-limiting example metrics formats to which the local metrics may be converted include Programs Management Analytics and Technologies (PMAT) or Coral metrics. The statistics consumer 175 of FIG. 1B may be a system external to the monitoring service 115 and may represent a PMAT or other consumer that the user or administrator may wish to use for monitoring the metrics.

Java virtual machines, as an example, may include any number of metric collectors built in and from which the local metrics may be extracted. In another configuration, the Java virtual machine may push the metrics to the monitoring service (rather than having the metrics extracted). The local metrics may be monitored independently of the service provider environment metrics for any number of local devices. In other words, the monitoring service may be used to monitor the metrics of local devices regardless of whether service provider environment metrics for services from the service provider environment are also monitored. Users may register metrics collectors with the monitoring agents and override metrics collectors at various levels. For example, at a request level an administrator may specify what kind of metrics collector to use, at a service client level, and/or at system level. The metrics collector specified may be given precedence over any default metrics collectors. The metrics collection may thus have multi-level extensibility, be performed by programming with user-specified metrics collector module registration, and the implementation may behave according to the SPI. In one example, the metrics collector may be the monitoring agent (120, FIG. 1A) on the local resources 112 (e.g., local device 110, FIG. 1A).

The management console 170 may be used by the administrator to view statistics for the collected metrics. The monitoring service 115 may provide an alarm service 162 to send notifications 166 or automatically make changes (such as scaling 168 of service provider resources) to the resources being monitored based on rules that are defined by the administrator. For example, the administrator may wish to monitor CPU usage and disk reads and writes, and then use this data to determine whether to launch additional computing instances to manage increased load, or this data may be used to stop under-used computing instances to save money. The alarm service 162 may be used to stop, start, or terminate applications, processes, computing instances, and so forth when certain criteria meeting predefined rules are met. In addition, the alarms may initiate auto scaling and/or notification actions.

The monitoring service 115 may include a metrics repository or data store from which administrators 180 or other statistics consumers 175 may retrieve statistics 164 based on those metrics 160. The metrics 160 may be used to calculate statistics 164 and present the data graphically in the management console 170. The management console 170 may enable an administrator 180 to view graphs and statistics for any of the collected metrics and view a quick overview of alarms and monitored resources in one location. Once metrics 160 are uploaded to the monitoring service 115, the metrics 160 may be visualized in the management console 170, or the administrator 180 may define and set alarms 162 for potential problems or issues such as memory leakage, file descriptor leakage, and so on.

In one example, every time there is a service request to the service provider resources 132 from the local resources 112 via the SDK for Java, metric data points may be generated, queued for statistical summary, and then uploaded asynchronously to the monitoring service 115, such as about once every minute for example.

The default set of local metrics for the local resources 112 may be divided into three categories. These categories may include: request metrics, service metrics, and machine metrics. Request metrics may include data such as the latency of HTTP (Hyper Text Transfer Protocol) requests/responses, a number of requests, exceptions, and retries on the local machine side. The request metrics may reflect the performance of the SDK, which may be sending the requests. Examples of service metrics may include the throughput and byte count metrics for storage uploads and downloads to a storage service in the service provider environment. Machine metrics may cover the runtime environment, including heap memory, number of threads, and open file descriptors, for example. In a more specific example, the machine metrics may represent a process virtual machine (e.g., a Java Virtual Machine) consumption of resources. The management console may identify and maintain a tie or link between received local metrics and a monitoring agent or SDK generating the metrics. Further, the management console 170 may link the local metrics to a specific compute instance such that the local metrics can be compared to and/or correlated with service provider environment metrics from the specific compute instance. For example, the local metrics, when uploaded, may include a local machine identifier that is linked to a compute instance identifier. As an alternative example, the local metrics may include the compute instance identifier. In one example, the SDK and/or compute instance may send a "who am I?" request to a metadata service, which may then respond with a local machine identifier and/or compute instance identifier to include with the metrics. The management console 170 may provide a graphical user interface (GUI) by which a user may associate the local and service provider environment metrics, such as based on the identifiers included in the collected metrics or supplied by the user.

The metadata service may be used to push configuration information out to a compute instance. In one example, a user may use the metadata service to push through a request to trigger metrics collection so that the user can initiate the monitoring activities of the monitoring agent(s). For example, a notification may be sent through the metadata service (e.g., in response to a query to the metadata service) from a customer compute instance in the service provider environment to the local machine to enable and initiate collection of local metrics on the local machine.

The management console 170 may provide machine analysis 190 of statistics 164 and/or metrics received from the monitoring service 115. For example, business rules, scripts, machine learning and the like may be used to analyze the statistics 164 for the presence of known or predefined issues, resource usage beyond a predetermined threshold and so forth to identify issues, problems, etc. These may be flagged in the management console 170 for the administrator 180 to review. In some examples, the management console may perform a machine comparison of service provider environment metrics with local metrics, such as to identify whether the source of issues originate from the local resources 112 or the service provider resources 132, as is described in greater detail with respect to FIG. 2.

It should be appreciated that although certain implementations disclosed herein are described in the context of computing instances or virtual machines, other types of computing configurations can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources.

The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

The systems of FIGS. 1A-1B may be implemented across one or more computing devices, which may be connected via a network. For example, the local device or local resources may host various engines and/or modules and such modules may be executable by a processor of the local device. The local device may be implemented as a plurality of computing nodes, each of which comprises at least one processor and a memory, where the computing nodes are configured to collectively implement the modules, data stores and so forth.

The local resources 112 or local device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the local device or networked computing resources according to various implementations. Also, various data may be stored in a data store that is accessible to the local device or networked computing resources. The data store may be representative of a plurality of data stores as may be appreciated. The data stored in the data store, for example, may be associated with the operation of the various applications and/or functional entities described. The components executed on the local device or networked computing resources may include any of a variety of applications, services, processes, systems, engines or functionality not discussed in detail herein.

Services provided through the service provider environment, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Figure 2:
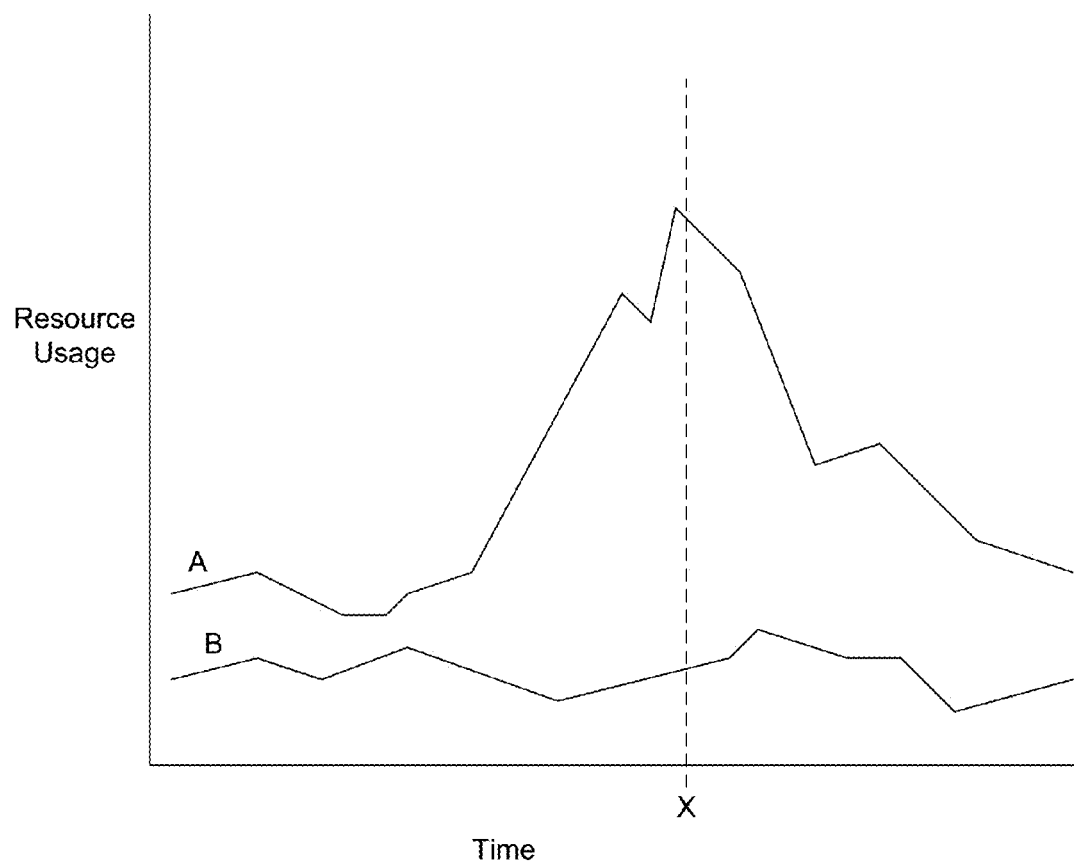
FIG. 2 is a graph of statistics for collected metrics viewable through a management console in accordance with an example of the present technology.

Referring to FIG. 2, an example graph of statistics for collected metrics available through a management console is provided. The graph illustrates statistics of resource usage metrics over time. The resource usage metrics may represent processor (e.g., CPU), memory, storage, etc. The graph includes two lines A and B. In one example, one of lines A and B may represent a metric for a local device and the other of lines A and B may represent a metric for a remote device in the service provider environment. While the metrics for these different devices may optionally be displayed in separate graphs, combining the metrics into a single graph may be useful in visualizing performance of the devices relative to one another. For example, if an administrator is aware of an issue that occurred at time X for a service or application executing on the local device and relying on processing, data or the like from the remote device, then the placement of the metrics from both devices on a same graph may allow the administrator to visually determine whether the issue was a result of excessive resource usage or other problems on the local device or the remote device, or both. For example, if line A represents the local device and line B represents the remote device, the spike in resource usage near time X on line A may indicate that the issue occurred at the local device rather than the remote device. Conversely, if line A represents the remote device and line B represents the local device, the spike in resource usage near time X on line A may indicate that the issue occurred at the remote device rather than the local device. Thus, rather than troubleshooting both the local and remote devices, the administrator may easily narrow troubleshooting efforts to the appropriate device. Similar graphs for multiple different metrics may be useful in narrowing which metrics on which device to focus on for troubleshooting, analysis, etc. Without easily available metrics from a local device, an administrator of resources through the service provider environment may have difficulty in identifying a source of an issue when performance and other metrics from the service provider environment resources appear to be functioning properly.

Figure 3:
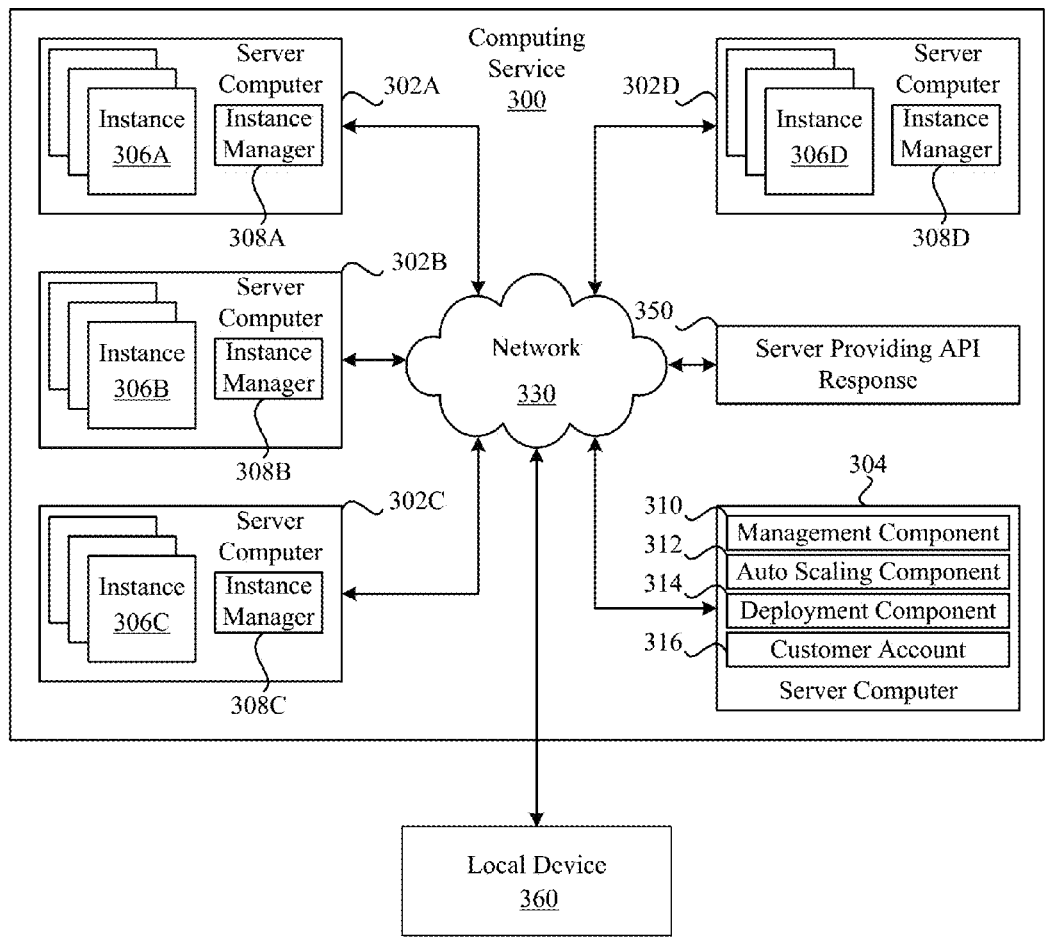
FIG. 3 is a schematic overview of a computing resource provider in accordance with an example of the present technology.

FIG. 3 illustrates how networked computing resources or services may function in a computing service 300 or a service provider environment (130 in FIG. 1A). Whereas discussion relating to FIGS. 1-2 focused largely on metrics and monitoring of metrics from local resources (e.g., local device 360) and service provider resources, discussion of FIG. 3 may relate more to the computing service 300 or service provider environment providing the remote or networked computing resources to be managed by the distribution operating system.

As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. For the IaaS model, the service provider environment may offer computers as physical or virtual machines and other resources. The PaaS model may deliver a computing platform that can include an operating system, programming language execution environment, database, and web server. Application developers may develop and run software solutions in the service provider environment without the cost of buying and managing the underlying hardware and software. The SaaS model allows installation and operation of application software in the service provider environment. In some implementations, end users access the computing service 300 using networked client devices, such as desktop computers, laptops, tablets, smartphones, etc running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing computing instances or software instances 306A-306D. In one implementation, the instances 306A-306D may be virtual machines or computing instances. A virtual machine may be an instance of a software implementation of a machine (i.e. a computer) that executes applications like a physical machine. In the example of a virtual machine, each of the servers 302A-302D may be configured to execute an instance manager 308A-308D capable of executing the instances. The instance manager 308A-308D may be a hypervisor or another type of program configured to enable the execution of multiple instances 306A-306D on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302A-D and the instances 306A-D. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 based upon rules defined by the customer. In one implementation, the auto scaling component 312 may allow a customer to specify scale-up policies for use in determining when new instances should be instantiated and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP (Internet Protocol) addresses used to access the account, etc. Information such as the unique identifier, IP addresses used to access the account and so forth may be used in authenticating a user to the service provider environment.

A network 330 may be utilized to interconnect the server computers 302A-302D and the server computer 304, 350. The network 330 may be a local area network (LAN) and may be connected to a Wide Area Network (WAN) so that end users may access the computing service 300. It should be appreciated that the network topology illustrated in FIG. 3 has been simplified and that many more networks and networking devices may be utilized to interconnect the various computing systems disclosed herein.

A server providing API response 350 may be a server for providing a response to an API request, such as to process the request, to grant the request, to deny the request and so forth.

Figure 4:
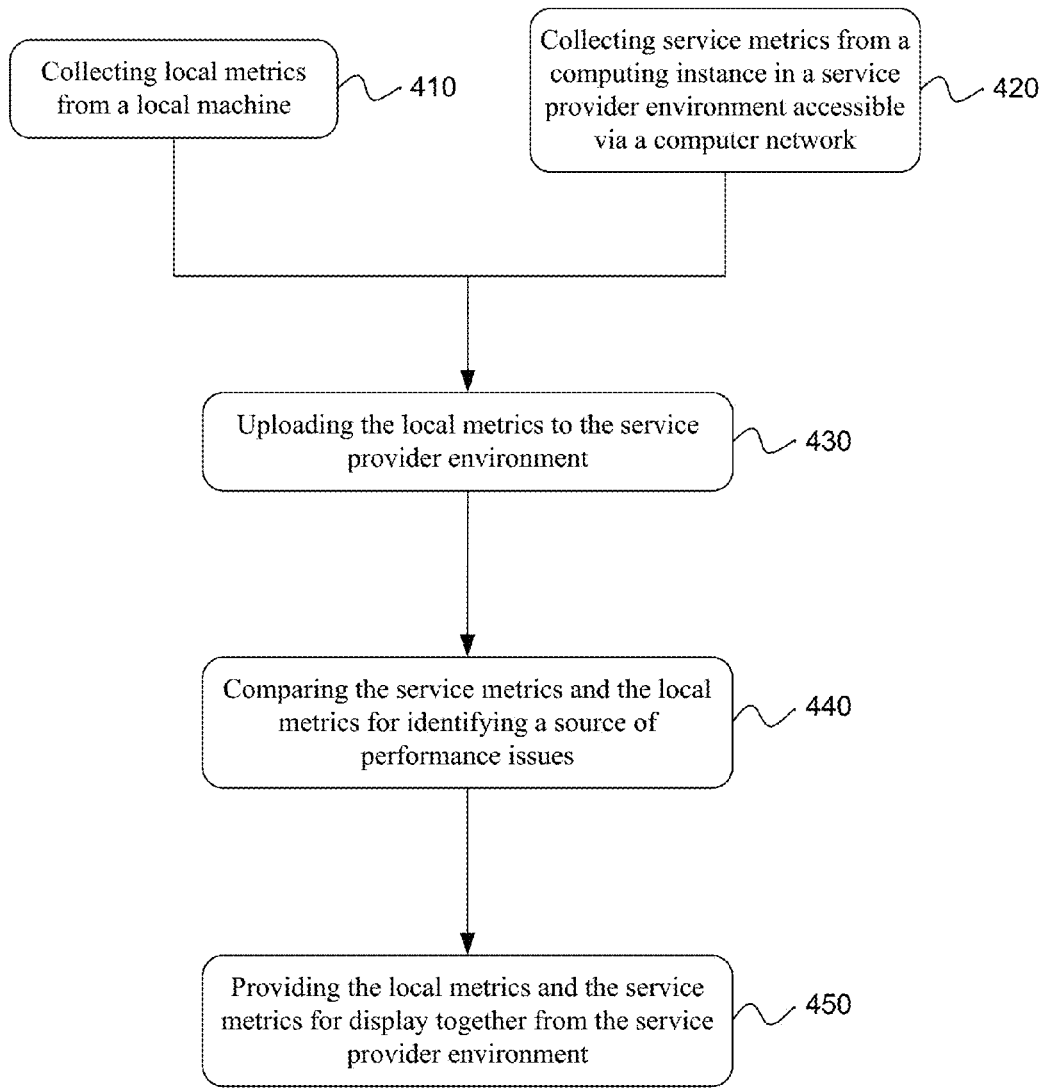
FIGS. 4-5 are flow diagrams for methods of implementing metrics collection in accordance with examples of the present technology.
Figure 5:
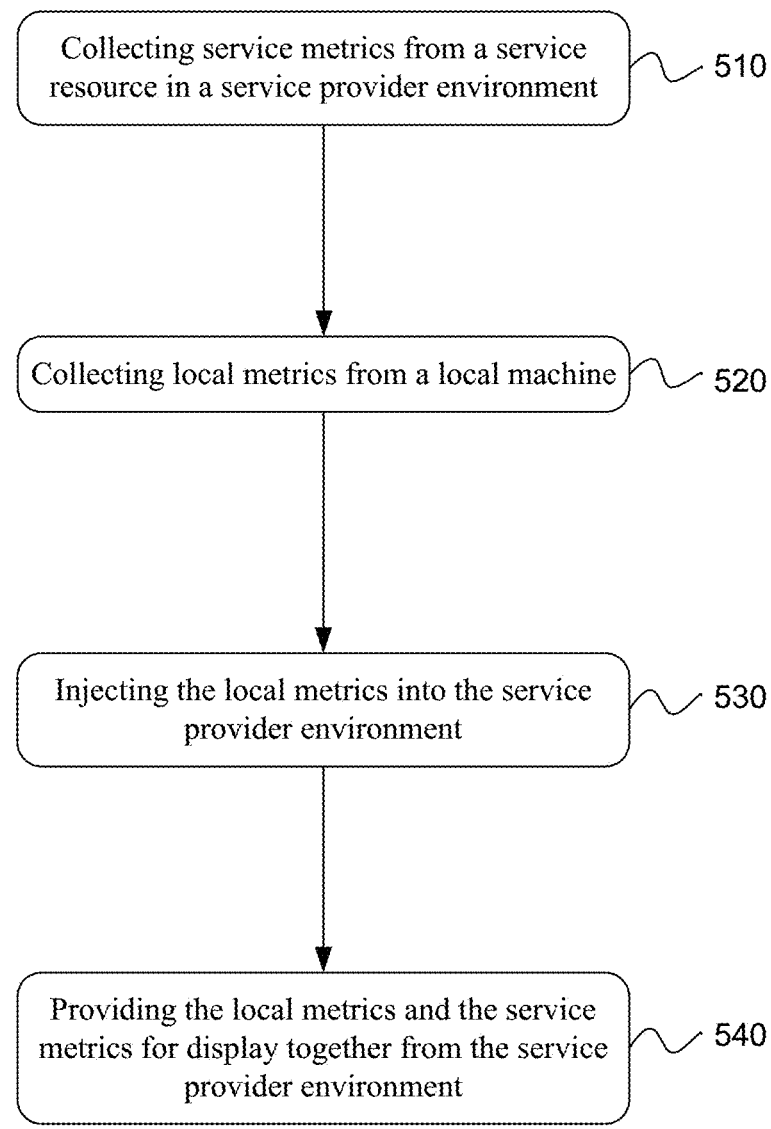

FIGS. 4-5 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 4, a flow diagram of a method is illustrated for the provisioning and use of local metrics in a service provider environment in accordance with an example of the present technology. The method may include collecting 410 local metrics from a local machine and collecting 420 service provider environment metrics from a computing instance in a service provider environment accessible via a computer network. The local metrics may relate to performance of the local machine during execution of an application that utilizes a service on the computing instance. It is noted that while the steps of collecting the local and service provider environment metrics at 410 and 420 are illustrated in a parallel manner in FIG. 4, these steps may also be performed in series in a desired order. The local metrics may be uploaded 430 to the service provider environment in a format suitable for injection into data representing the service provider environment metrics. The service provider environment metrics and the local metrics may be combined and/or compared 440 to identify a source of performance issues. Collecting the local and service provider environment metrics in parallel may be useful in combining or comparing the metrics because data for a same or similar time may be available for more accurate correlation of the metrics. The local metrics and the service provider environment metrics may be provided 450 for display together from the service provider environment.

While this example includes the collection of local metrics and service provider environment metrics, as well as the comparison of the local metrics with the service provider environment metrics, the present technology may be used to monitor local metrics specifically without necessarily also monitoring the service provider environment metrics. For example, a user may desire to monitor one or more local devices, or devices that are not provided by the service provider environment, even without the use of compute, storage, or other service provider resources. In other words, the present technology may enable the user to monitor performance and other metrics of the local or third party devices remotely using the monitoring service without using other resources from the service provider, or at least without comparing and/or aggregating metrics from both the local and service provider resources.

In one example, the local machine may be a Java virtual machine or may run a Java virtual machine. In another example, the local machine may utilize the Android operating system and may run applications which are converted at run time from Java virtual machine-compatible Java class files to Dalvik compatible files, where Dalvik represents the process virtual machine (VM) in the Android operating system. Other types of machines, virtual or otherwise, running any other suitable type of operating system, application, run-time or the like may also be used.

Collecting the local metrics may include collecting the local metrics from an application executing on the local machine or collecting the metrics from the local machine executing the application. The application may be in communication with the service resource for accessing data, memory, processing, etc. In one example, the application may be executed partially on the local device and partially at the service resource. In another example, an application may be executed on the local device and another application may be executed on the service resource, and one or both of the applications may have a dependency on the other application.

The method may include collecting and formatting the local metrics using an SDK running in a process space of the local machine. The method may further include uploading the local metrics to the service provider environment using an API.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 5, a flow diagram of a method is illustrated for the provisioning and use of local metrics in a service provider environment in accordance with another example of the present technology. The method may include collecting 520 local metrics from a local machine. The method may also optionally include collecting 510 service provider environment metrics from a service resource in a service provider environment. It is noted that while the steps of collecting the local and service provider environment metrics at 510 and 520 are illustrated in a serial manner in FIG. 5, these steps may also be performed in parallel or in reverse order. The local metrics may be extracted or collected and formatted at the local machine and then uploaded using an API and injected 530 into the service provider environment.

The local metrics may be provided 540 for display. For example, a user may use a management console to view statistics of the metrics graphically in order to monitor the local metrics, such as to determine a status of the local machine, identify performance issues, and so forth. In an example where the method includes collecting the service provider environment metrics, the local metrics may be provided for display together with the service provider environment metrics from the service provider environment. The service resource may be a networked computing service such as, for example, a compute, storage, networking and/or other computing service.

Where the local metrics and service provider environment metrics are provided for display together, the method may include comparing the service provider environment metrics and the local metrics to identify a source of performance issues. The local and service provider environment metrics may be combined and/or displayed together in any suitable manner, an example of which was described with respect to FIG. 2 previously. For a comparison of the metrics, time stamps or other characteristics of the metrics may be compared to correlate the local metrics with the service provider environment metrics. An administrator may view statistics, graphs, etc. of the metrics to identify a source of issues, improve performance and the like.

In other examples, the administrator may define alarms, scripts or the like to notify the administrator when an issue arises, such as when performance is poor, where memory leakage is discovered, where CPU usage is excessive and so forth. The method may therefore include setting an alarm for troubleshooting, identifying trends, or performing an automated action based on a state of the service resource as identified using the service provider environment metrics. The method may also or alternatively include setting an alarm for troubleshooting, identifying trends, or performing an automated action based on a state of the local machine as identified using the local metrics. The method may further also or alternatively include setting an alarm for troubleshooting, identifying trends, or performing an automated action based on a combination of the service provider environment metrics with the local metrics.

Having the local and networked service provider environment metrics available enables the system to identify whether the source of issues originate from the local machine or the service provider resource(s). Thus, an automated, machine identification of issues, sources, causes, etc. may simplify the task of resolving the issues as well as decrease the time expended by the administrator in resolving the issues.

The local metrics collected in the method may include request metrics, machine metrics or service metrics, as have been described previously. For example, the request metrics may include latency of requests and a number of requests. The machine metrics for the local machine may, for example, be metrics for a runtime environment of the local machine and may include metrics for at least one of heap memory, number of threads or open file descriptors.

Similarly as mentioned in the description of the method illustrated in FIG. 4, additional example details, operations, options, variations, etc. that may be part of the method illustrated in FIG. 5 have been described previously herein and/or are described in further detail below. Various systems, devices, components, modules and so forth for implementing the method may also be used, as described with respect to the various examples included in this disclosure.

In some examples, this or other methods described herein may be implemented wholly or partially as computer readable program code executed by a processor and the computer readable code may be embodied on a non-transitory computer usable medium.

In one example, a system for providing local metrics in a service provider environment may include a processor and a memory device including instructions that are executable by the processor to cause the system to perform a method. An example method performed by the system may include collecting service provider environment metrics from a service resource in a service provider environment and collecting local metrics from a local machine in communication with the service resource. The local machine may include or execute an application configured to communicate with the service resource. The local metrics may relate to performance of the local machine during execution of the application. The method may further include uploading the local metrics to the service provider environment, generating a comparison of the service provider environment metrics and the local metrics to identify a source of performance issues, and providing the comparison of the local metrics and the service provider environment metrics for display from the service provider environment. For example, the metrics and/or the comparison of the metrics may be provided by a management console associated with a monitoring service.

The system may further implement a method for formatting the local metrics for the service provider environment on the local machine using an SDK configured to perform the formatting. The method may further include accessing an API to upload the local metrics to the service provider environment, where the local metrics may be injected into the monitoring service and may be combined and/or compared with the service provider environment metrics. The system may implement a method for collecting request metrics, including latency of requests or a number of requests; and machine metrics for the local machine, including a heap memory, number of threads or open file descriptors. Some example service metrics used by the method implemented by the system may include throughput and byte count metrics for data uploads and downloads.

Figure 6:
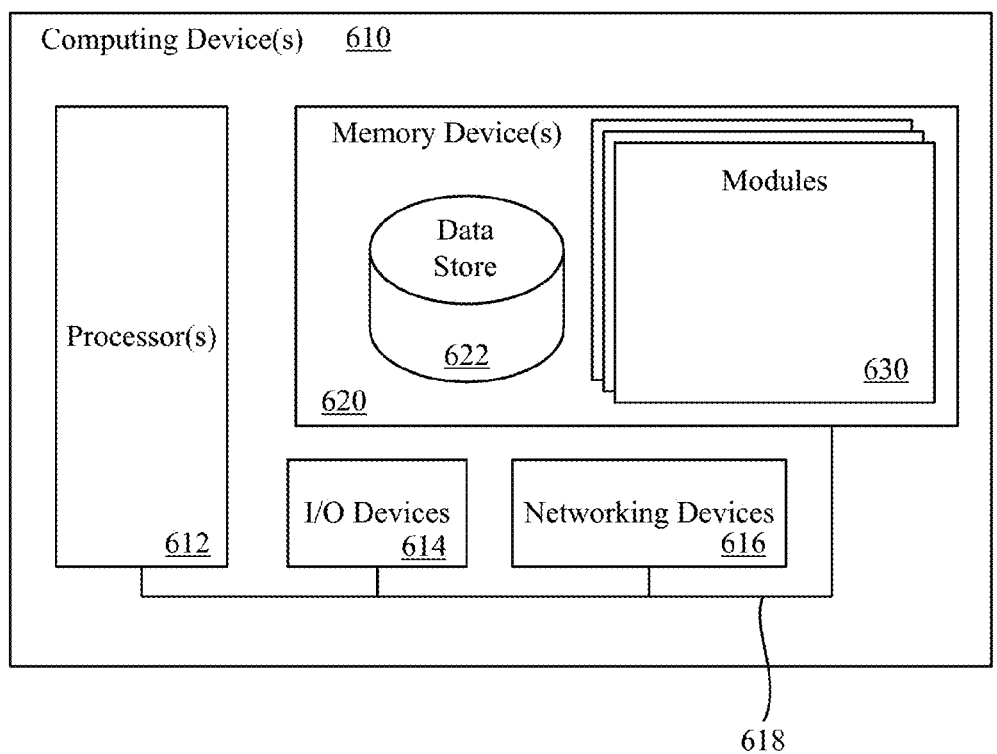
FIG. 6 is a block diagram of a computing system for implementing a metrics collection in accordance with an example of the present technology.

FIG. 6 illustrates a computing device 610 on which services or modules of this technology may execute. A computing device 610 is illustrated on which a high level example of the technology may be executed. The computing device 610 may include one or more processors 612 that are in communication with memory devices 620. The computing device 610 may include a local communication interface 618 for the components in the computing device. For example, the local communication interface 618 may be a local data bus and/or any related address or control busses as may be desired.

The memory device 620 may contain modules 630 that are executable by the processor(s) and data for the modules. A data store 622 may also be located in the memory device 620 for storing data related to the modules and other applications along with an operating system that is executable by the processor(s) 612.

The computing device 610 may further include or be in communication with a client device, which may include a display device. The client device may be available for an administrator to use in interfacing with the computing device 610, such as to review metrics, define alarms, manage resources and so forth.

Various applications may be stored in the memory device 620 and may be executable by the processor(s) 612. Components or modules discussed in this description that may be implemented in the form of software using high programming level languages that are compiled, interpreted or executed using a hybrid of the methods.

The computing device 610 may also have access to I/O (input/output) devices 614 that are usable by the computing devices. An example of an I/O device 614 is a display screen that is available to display output from the computing devices. Other known I/O device may be used with the computing device as desired. Networking devices 616 and similar communication devices may be included in the computing device 610. The networking devices 616 may be wired or wireless networking devices 616 that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor 612. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Functional units, services or the like may be implemented as a hardware circuit comprising custom VLSI circuits or gate arrays, off-the-shelf semiconductors such as logic chips, transistors, or other discrete components. Functional units, services or the like may also be implemented in programmable hardware devices such as field programmable gate arrays, programmable array logic, programmable logic devices or the like.

Functional units, services or the like may also be implemented in software for execution by various types of processors. An identified module of executable code may, for instance, comprise one or more blocks of computer instructions, which may be organized as an object, procedure, or function. Nevertheless, the executables need not be physically located together, but may comprise disparate instructions stored in different locations and achieve the stated purpose for the executables when joined logically together.

Executable code may be a single instruction, or many instructions, and may even be distributed over several different code segments, among different programs or applications, and across several memory devices. Similarly, operational data may be embodied in any suitable form and organized within any suitable type of data structure. The operational data may be collected as a single data set, or may be distributed over different locations including over different storage devices.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computer-implemented method, comprising:
receiving local metrics, at a monitoring service associated with a multi-tenant service provider environment, from a first monitoring agent running in a local machine in the multi-tenant service provider environment accessible via a computer network, wherein the first monitoring agent is a software development kit that collects the local metrics at the local machine;
receiving service provider environment metrics, at the monitoring service, from a second monitoring agent, wherein the service provider environment metrics are based on the services and resources provided by the service provider environment and are collected by the second monitoring agent at the multi-tenant service provider environment;

comparing the service provider environment metrics and the local metrics, at the monitoring service, for identifying a source of performance issues; and providing a notification regarding the source of performance issues and the local metrics and the service provider environment metrics for display together from the multi-tenant service provider environment.

2. The method of claim 1, wherein the local machine comprises a process virtual machine.

3. The method of claim 1, wherein receiving the local metrics comprises receiving the local metrics from an application executing on the local machine.

4. The method of claim 1, further comprising receiving the local metrics as summarized local metrics, the local metrics being summarized using an API running in a process space of the local machine and received at the multi-tenant service provider environment.

5. A computer-implemented method, comprising:

receiving service provider environment metrics, at a monitoring service associated with a multi-tenant service provider environment, from a first monitoring agent, wherein the service provider environment metrics are based on the services and resources provided by the service provider environment and are collected by the first monitoring agent at the multi-tenant service provider environment;

receiving local metrics, at the monitoring service, from a local machine in a multi-tenant service provider environment, wherein the local metrics are collected by a second monitoring agent at the local machine;

comparing the local metrics and the service provider environment metrics, at the monitoring service, for identifying a source of performance issues; and providing a notification regarding the source of performance issues and the local metrics and the service provider environment metrics from the multi-tenant service provider environment.

6. The method of claim 5, further comprising receiving the local metrics at the multi-tenant service provider environment as formatted local metrics formatted by using an API running in a process space of the local machine.

7. The method of claim 5, wherein comparing the local metrics and the service provider environment metrics uses machine learning to determine whether a source of the performance issues originates from resources related to the local machine or the service provider environment.

8. The method of claim 5, further comprising setting an alarm for a customer-specified metrics condition that causes a notification to be sent to a customer.

9. The method of claim 5, further comprising sending a notification from the multi-tenant service provider environment to the local machine to initiate collection of the local metrics.

10. The method of claim 5, further comprising setting an alarm for troubleshooting, identifying trends, or performing an automated action based on a combination of the service provider environment metrics with the local metrics.

11. The method of claim 5, wherein the local metrics comprise request metrics including latency of requests and a number of requests.

12. The method of claim 5, wherein the local metrics comprise machine metrics for the local machine.

13. The method of claim 12, wherein the machine metrics are metrics for a runtime environment of the local machine and include metrics for at least one of: heap memory, number of threads or open file descriptors.

14. The method of claim 5, further comprising receiving the local metrics as summarized metrics.

15. A system for providing local metrics in a multi-tenant service provider environment, comprising:

at least one processor;

a memory device including instructions that, when executed, cause the system to:

receive service provider environment metrics from a first monitoring agent, at a monitoring service associated with the multi-tenant service provider environment, wherein the service provider environment metrics are based on the services and resources provided by the service provider environment and are collected by the first monitoring agent at the multi-tenant service provider environment;

receive local metrics, at the monitoring service, from a local machine in the multi-tenant service provider environment in communication with the computing instance, wherein the local metrics are collected by a second monitoring agent at the local machine;

combine the service provider environment metrics and the local metrics, at the monitoring service, to enable identification of a source of performance issues; and provide a notification regarding the source of performance issues and the local metrics and the service provider environment metrics for display from the multi-tenant service provider environment.

16. The system of claim 15, wherein the local machine comprises a process virtual machine.

17. The system of claim 15, wherein the local machine further includes an application configured to communicate with the computing instance and the local metrics relate to performance of the local machine during execution of the application.

18. The system of claim 15, wherein the local metrics are formatted at the local machine using an API configured to format the local metrics for the multi-tenant service provider environment and are received at the multi-tenant service provider environment when the local machine accesses an API to upload the local metrics to the multi-tenant service provider environment.

19. The system of claim 15, wherein the local metrics comprise:

request metrics, including latency of requests or a number of requests; and machine metrics for the local machine, including a heap memory, number of threads or open file descriptors.

20. The system of claim 15, wherein the service provider environment metrics include throughput and byte count metrics for data uploads and downloads.

* * * * *